United States Patent [19]

Volkov et al.

[11] Patent Number: 5,331,329
[45] Date of Patent: Jul. 19, 1994

[54] SATELLITE-AIDED RADIO NAVIGATION POSITIONING METHOD AND RADIO NAVIGATION SYSTEM THEREFOR

[75] Inventors: Nikolai M. Volkov; Stanislav S. Glazov; Nikolai E. Ivanov; Mikhail A. Ljubimov; Vadim A. Salischev; Boris G. Sergeev; Valery V. Tjubalin, all of Moscow; German M. Alyabina, deceased, late of Moskovskaya oblast, by Ljudmila G. Alyabina, administrator; Valery F. Kovalenko, deceased, late of Moscow; by Tatyana P. Shishkova, administrator, Moscow; Sergei V. Kovalenko, administrator, Moscow; Nikita V. Kovalenko, administrator, Moscow; Nadezhda V. Kovalenko, administator, Moscow, all of Russian Federation

[73] Assignee: Nauchno-Issledovatelsky Institut Kosmicheskogo Priborostoenia, Moscow, Russian Federation

[21] Appl. No.: 930,556
[22] PCT Filed: Jan. 30, 1990
[86] PCT No.: PCT/SU90/00033
§ 371 Date: Sep. 29, 1992
§ 102(e) Date: Sep. 29, 1992
[87] PCT Pub. No.: WO91/11732
PCT Pub. Date: Aug. 8, 1991

[30] Foreign Application Priority Data

May 25, 1988 [SU] U.S.S.R. ............................... 4430342

[51] Int. Cl.[5] .......................... G01S 5/02; H04B 15/00
[52] U.S. Cl. ....................................... 342/357; 375/1
[58] Field of Search ............... 342/352, 357, 457, 458, 342/461; 455/12.1, 17; 375/1

[56] References Cited

U.S. PATENT DOCUMENTS

| | | | |
|---|---|---|---|
| 3,789,409 | 1/1974 | Easton | 342/357 |
| 4,048,563 | 9/1977 | Osborne | 375/1 |
| 4,291,409 | 9/1981 | Weinberg et al. | 375/1 |

Primary Examiner—Gregory C. Issing
Attorney, Agent, or Firm—Ladas & Parry

[57] ABSTRACT

A method for radio navigation positioning with the aid of satellites, in accordance to which a radio navigation signal is generated on board the satellites (1) by modulating the carrier frequency ($f_c$) with an assemblage of signals including a pseudorandom sequence, the navigation data, and a synchronization code, and the object-users (2) determine their positioning, speed of mation and a correction factor to the time scale during reception and processing of the radio navigation signal. According to the invention, each satellite or pair of mutual opposite satellites on an orbital plane are ascribed individual carrier frequencies ($f_{cj}, f_{ck}$) and use a common to all satellites (1) pseudorandom M-sequence of truncated length, dibit coding of navigation data symbols and synchronization code of shortened repetition period and increased number of symbols. According to the invention, the radio navigation system completely implements this method on board each satellite (1) in the radio navigation signal generating and transmitting system and at each object-use (2) in the radio signal reception and processing subsystem. This improves the probability of navigation positioning at any instant of time with a high accuracy by practically completely eliminating the effects of intersystem interference and also substantially shortens the time of navigation positioning.

8 Claims, 7 Drawing Sheets

SATELLITE-AIDED RADIO NAVIGATION POSITIONING METHOD AND RADIO NAVIGATION SYSTEM THEREFOR

TECHNICAL FIELD

This invention relates to radio navigation systems for position fixing, in particular to radio navigation positioning methods with the aid of satellites and radio navigation systems thereof, based on measuring the phase difference between the radio navigation signals received. More specifically, it relates to systems, wherein the satellites generate pseudorandom radio navigation signals, uniquely related to the satellite's preceision time and frequency primary standard.

PRIOR ART

Currently known in the art is a satellite radio navigation system, named the "Global Positioning System (GPS)" or "Navstar" (Navigation (USA), 1978, v. 25, No. 2), using a plurality of satellites to position any object-user, each object equipped with a receiver sensitive to radio navigation signals of said Navstar system satellites. The Navstar system comprises a total of 18 sattelites, three per each of the six circular 12-hour orbits. The orbit planes are uniformly inclined to their adjacent orbits by 60° and the position of any satellite is precisely known for any moment of time.

The position fix of an object-user in any point of the Earth or near it can be taken by measuring the pseudodistance to four satellites that are in the radio visibility zone of this object.

Furthermore, pseudodistance measurements allow determining the object's time scale shift relative to the universal coordinated time, whereas additional measurements of the radial pseudospeed (the rate of pseudodistance variation) allow defining the speed of the object's movement.

All satellites of the said Navstar system transmit a radio navigation pseudonoise signal with one and the same carrier frequency $f_c = 1572.42$ MHz, Identification of each satellite in the system is by the individual ranging pseudorandom sequence assigned to the satellite and modulating the carrier. In one mode, termed the easily detected (C/A) signal mode, the pseudorandom sequence is the Gold code with a code element transmission rate of 1.023 MHz and each code sequence comprising 1023 elements, so that the repetition rate of the sequence is 1 millisecond.

Along with the Gold code sequence each satellite of the said Navstar system transmits binary symbols at a 50 baud rate, these symbols carrying information on the satellite's ephemerides and clock (navigation data) necessary to calculate the receiver's position fix, and a synchronization code (preamble) marking the reference points of the navigation data. This preamble is repeated every six seconds in the form of a 8-symbol Barker code, the serially transmitted preamble and navigation data constituting the navigation message, thus composed of lines of six second length.

The radio navigation signal generation and transmitting subsystem on board the Navstar system satellites comprises a high-precision time and frequency standard, a carrier frequency generator, a Gold-coded pseudorandom sequence (individual for each sattelite), a navigation data generator, a synchronization code generator, a modulating signal generator to provide two-positional (0°–180°) phase modulation of the carrier frequency, this modulating signal being a modulus 2 sum of the navigation message symbols and pseudorandom sequence elements, and a transmitter.

In the user's receiver the arriving radio navigation signal is correlated to a reference signal. The heterodyne frequency of the reference signal is fixed relative to signals received from all satellites of said Navstar system, and the generated copy of the Gold-coded sequence varies in accordance with the satellite number, whose signal is being received. The correlations between the Gold-coded sequence and its copy is analyzed until the autocorrelation function attains its maximum (autocorrelation peak), this evidencing synchronism between the Gold-coded sequence and its copy. On attaining this synchronism, as well as the synchronization of the carrier frequency phase, the pseudodistance and the pseudospeed are measured and the navigation message is received.

The radio navigation signal reception and processing subsystem at the object-user comprises a front end reception device to amplify, filter and convert the frequency of signals arriving from the output of the receiving antenna, a local oscillator and other reference frequencies generators, a pseudoradom sequence delay detector and tracking device. The pseudorandom sequence delay detector and tracking device in turn comprises a received Gold-code copy generator, a carrier frequency deterctor and tracking unit, a navigation message demodulator to detect the synchronization code and navigation data, and a navigation processor. The latter uses the detected synchronization code to set the reference point of the received navigation data (start of the navigation message line), and the output data of the Gold code detection and tracking unit and of the carrier frequency detection and tracking unit to execute measurements of the pseudodistance and radial pseudospeed. Serial or parallel processing of the signals arriving from four satellites allows this processor to thereafter calculate the position fix and speed of the object-user, along with a correction factor for its time scale.

The radio navigation signals in the said Navstar system feature an identical carrier frequency, so that their selection in the receiver of the object-user necessitates a sufficiently high peak autocorrelation corresponding to the local Gold code sequence and the sequence received from the desired satellite, as compared to the side lobes of the cross-correlation function of the local sequence relative to Gold code sequences arriving from other sattelites within the receiver's radio contact range. The difference between the amplidutes of the autocorrelation peak and the side lobes increases with an increase in the number of elements in the Gold code, so that a sufficiently long Gold code sequence of 1023 elements is used in the said Navstar system to ensure an amplitude difference adequate to provide proper signal selection. In the general case this results in a longer time to establish synchronism of this sequence. However, the necessary radio of the autocorrelation peak and side lobes amplitudes can be substantially impaired, at a fixed length of the Gold code sequence, during the receiver operation if the signal power received from the desired satellite falls off significantly relative to that of signals simultaneously arriving at the receiver input from other satellites. Such a situation may arise as a result of the antenna beam pattern distortion at low elevation angles, due to signal re-reflection from the structural elements of the object-user and from the underlying surface, under actual conditions of antenna mounting at the object. This is equivalent to an increase in system interference at the reception site produced by the conjoint operation of several satellites within the receiver's radio contact range, resulting in a lower probability of positioning the object with the desired accuracy at any instant of time.

To demodulate the binary symbols in the navigation message the receiver has to detect the symbol rate pulses which define the boundaries of the received signals. The phase of this frequency is determined by noting the instants at which the symbol polarity is reversed, i.e. the reversal in symbol polarity during changes from "unity" to "zero" and vice versa. The repetition rate of "unities" and "zeroes" in the navigation data stream can differ substantially, i.e. symbols of opposite polarities may be statistically non-uniform distributed, so that long time intervals without symbol polarity reversal may arise, this resulting in sustantially longer symbol synchronization times; i.e. the said Navstar system receiver will require a longer time to detect the proper phase of the symbol repetition rate, at which the required validity of detecting binary symbols will be ensured.

Using an 8-bit code sequence as the synchronization code can lead to a lower probability of proper navigation data reference point detection in the receiver in the presence of random noise, as provided by the navigation processor during a single cycle of synchronization code reception.

Furthermore, using synchronization codes of reduced bit capacity inceases the probability of false synchronization codes generation from the received symbols of navigation data. Both these considerations in combination may lead to the necessity of a longer analysis of the validity of synchronization code detection over several cycles of this code transmission. The period of the synchronization code transmission in the radio navigation signal of the said Navstar system is six seconds, so that the time to establish the reference points of navigation data may increase to dozens of seconds, substantially increasing the time of establishing receiver communications with the satellite.

DISCLOSURE OF THE INVENTION

The object of this invention is to provide a method for radio navigation positioning with the aid of satellites and a radio navigation system thereof, wherein the use of an individual carrier frequency of the radio navigation signal on each satellite, dibit coding of navigation data, and variations of the repetition period and number of symbols in the synchronization code of the navigation signal would provide a drastic reduction of intersystem interference, would allow a substantially shorter time of received data processing and would improve its validity.

This is achieved by that in the method for radio navigation positioning with the aid of satellites on several orbital planes, each having an individual number and generating a carrier frequency from the sine oscillations of its primary frequency and time standard for subsequent modulation by a group of signals, this group including: a pseudorandom sequence, navigation data symbols, and a synchronization code, whereas at the object-user a reference signal is generated to execute: correlation reception of said radio navigation signal, measurement of pseudodistance and radial pseudospeed of the object-user relative to the satellite, detection of navigation data and a timing mark, subsequently used to calculate the coordinates and speed of motion of the object-user, and also a correction factor for the object-user's time scale. According to the invention a carrier frequency of the radio navigation signal, individual for each satellite number or each pair of mutually opposite in the orbital plane satellites is generated on each satellite, a group of signals is generated and used to modulate this carrier frequency, this group including a common to all radio navigation signals M-sequence, dibit-coded navigation data symbols, and a synchronization code. At the object-user a reference signal is generated in which the heterodyne frequency thereof is selected in accordance with the number of the satellite transmitting the radio navigation signal being received.

When receiving radio navigation signals simultaneously from several satellites, the present invention allows, in the process of navigation positioning, neglecting mutual (intersystem) interference arising at substantially higher interfering signal powers at the reception site, as compared to that of the signal from the desired satellite, this taking place with serrated beam patterns of the user's antenna resulting from the effects of the undelying surface and the surrounding structures at the object. Additional introduction of dibit coding of navigation data symbols allows valid data detection, independent of its statistical structure.

It is expedient in these circumstances to use an M-sequence of shorter length, reducing its number of elements to 511.

This allows a substantially shorter time of synchronizing the M-sequence copy to the M-sequence received at the object-user during reception of radio navigation signals from the desired satellite.

The synchronizing code transmitted can have a repetition period of 2 seconds and a number of symbols equal to 30.

This allows shorter time to analyze the properness of detecting the reference point of the navigation data with the aid of the synchronization code.

This is also achieved in the radio navigation system for satellite-aided positioning comprising a radio navigation signal generation and transmission subsystem on board each satellite comprising: a primary frequency and time standard; a carrier frequency generator, comprising connected in series a frequency multiplier and a frequency modulator, with the input of the frequency multiplier connected to one of the outputs of the frequency and time standard; a transmitter connected to the carrier frequency modulator's output; a pseudorandom sequence shaper, comprising connected in series a clock frequency synthesizer and a pseudorandom sequence generator, with the input of the clock frequency synthesizer connected to the same output of the frequency and time standard, the other output whereof is connected to the other input of the pseudorandom sequence generator; a navigation data originator, comprising connected in series a navigation data symbol pulse rate generator and a navigation data symbol generator, with an input of the navigation data symbol pulse rate generator connected to an output of the pseudorandom sequence generator and with its other input connected to the other output of the frequency and time standard; a synchronization code shaper, comprising connected in series a synchronization code repetition period generator and a synchronization code generator with an input of the synchronization code repetition period generator and an input of the synchronization code generator both connected to the output of the navigation data symbol pulse rate generator, and with the other input of the synchronization code repetition period generator connect to the other output of the frequency and time standard, with the output of the synchronization code period generator connected to the other output of the navigation data symbols generator; a signal modulator, comprising connected in series a navigation message shaper and a modulus 2 adder, with one of the inputs of the navigation message shaper connected to the output of the navigation data symbol generator, with the other input of the navigation message shaper connected to the output of the synchronization code generator, with an input of the modulus two adder connected to the other output of the pseudorandom sequence generator, and with the output of the modulus two adder connected to the other input of the carrier frequency modulator. According to this invention the carrier frequency generator comprises a frequency synthesizer, individual to each satellite or each pair of mutually opposite satellites on an orbital plane, connected between an output of the frequency and time standard and the input of the frequency multiplier. The pseudorandom sequence generator in the pseudorandom sequence shaper generates an M-sequence common for all satellites and comprising 511 elements. The navigation data shaper comprises a dibit generator of symbol rate pulses, connected between the other output of the frequency and time standard and an input of the symbol pulse rate generator, with the other input of the dibit symbol rate pulses generator connected to an output of the pseudorandom sequence generator and with the other input of the navigation data symbol pulse rate generator connected to the output of the synchronization code period shaper. A Manchester code generator has an input thereof connected to the output of the dibit symbol rate pulse generator and with the other input thereof connected to the output of the synchronization code period shaper. A dibit coding unit is connected between the output of the navigation data symbol shaper and the input of the navigation message shaper, with the other input of the dibit coding unit connected to the output of the Manchester code generator. The synchronization code period shaper generates a repetition period of 2 seconds and the synchronization code generator generates a synchronization code with a number of symbols equal to 30, with one of the inputs of the synchronization code repetition period and an input of the synchronization code generator connected to the output of the dibit-coded symbol rate pulse generator.

This is also achieved by the radio navigation system for satellite-aided navigation positioning comprising a radio navigation signal reception and processing subsystem comprising: a heterodyne frequency shaper, comprising connected in series reference generator and frequency synthesizer; a front end device with the input thereof connected to the output of the frequency synthesizer; a correlation processor, comprising a pseudorandom sequence delay searching and tracking unit and a carrier frequency searching and tracking unit, with the inputs thereof connected to the output of the front end device; a navigation message demodulator, comprising a navigation data symbol rate pulse detector, a synchronization code and time mark detector, and a navigation data symbol detector, with the input of the navigation data symbol rate pulse detector, an input of the synchronization code and time mark detector and an input of the navigation data symbol detector all connected to an output of the carrier frequency searching and tracking unit, with the output of the navigation data symbol rate pulse detector at the same time connected to the other input of the synchronization code and time mark detector and to the other input of the navigation data symbol detector; a navigation processor with an input thereof connected to the output of the pseudorandom sequence delay searching and tracking unit, with the other input thereof connected to an output of the carrier frequency searching and tracking unit, with the third input thereof connected to the output of the navigation data symbol detector, with the fourth input thereof connected to the output of the synchronization code and time mark detector. According to this invention the frequency synthesizer in the heterodyne frequency shaper generates a local oscillator frequency according to the satellite number transmitting the radio navigation being received. An input of this frequency synthesizer is connected to the output of the navigation data processor. The pseudorandom sequence delay searching and tracking unit in the correlation processor uses the copy of the M-sequence common to all radio navigation signals received from the system's satellites. The navigation message demodulator comprises a dibit symbol rate pulse detector connected between an output of the carrier frequency searching and tracking unit and the other input of the synchronization code and time mark detector. A Manchester code generator has an input thereof connected to the output of the synchronization code and time mark detector and has the other input thereof connected to the output of the dibit symbol rate pulse detector. A dibit code detector has an input thereof connected to an output of the carrier frequency searching and tracking unit and has the other input thereof connected to the output of the dibit symbol rate pulse detector. A modulus two adder has one input thereof connected to the output of the dibit code detector and has the other input thereof connected to the output of the Manchester code generator. The output of the modulus two adder is connected to an input of the navigation data symbol detector, an input of the navigation data symbol rate pulse detector is connected to the output of the synchronization code and time mark detector and another input of the navigation data symbol rate pulse detector is connected to the dibit symbol rate pulse detector. The synchronization code and time mark detector in the navigation message demodulator executes time mark detection in the synchronization code with a repetition period of 2 seconds and number of symbols equal to 30.

This design configuration of the radio navigation signal generating and transmitting subsystem and of the navigation signal reception and processing subsystem practically excludes the effect of intersystem interference generated at the reception site during reception of signals from several satellites simultaneously within the radio contact range, in the possible presence of receiving antenna beam pattern distortions at the object-user due to environmental effects, allows substantially shorter times to synchronize the local pseudorandom sequence, to obtain symbol synchronization and to synchronize the reference point of the start of navigation data.

BRIEF DESCRIPTION OF ACCOMPANYING DRAWINGS

These and other objects of the invention will become apparent from the following description of a specific embodiment thereof and from the accompanying drawings, wherein.

PREFERRED EMBODIMENT OF THE INVENTION

Figure 1:
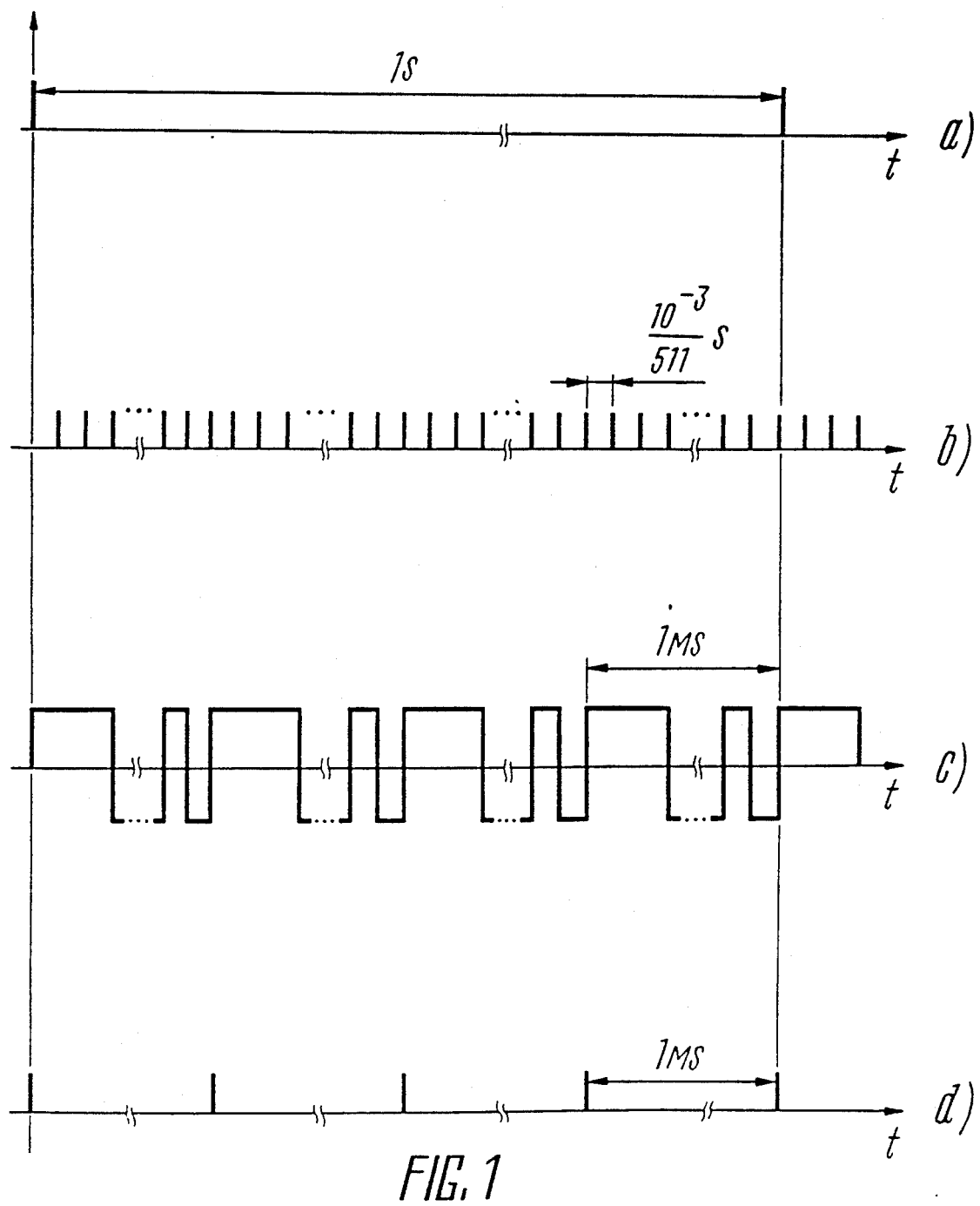
FIG. 1 shows the timing diagrams of the one-second marks of the satellite clock, the clock frequency pulses of the M-sequence, the elements of the M-sequence, and the pulses corresponding to the start and end of the M-sequence repetition, according to the invention.

The method for satellite-aided radio navigation positioning comprises a series of operations, providing generation of radio navigation signal on board the satellites and transmission of these signals, and a series of poerations, providing reception and processing of these radio navigation signals in the users equipment to define their positioning coordinates and speed of motion, and also generate correction factors for the user time scales.

The method is applicable in any satellite-aided radio navigation system and in the present detailed description thereof is illustrated by satellite radio navigation system, comprising the following components:

an orbiting system of a plurality, for instance 24, satellites (FIG. 4) uniformly distributed with a pitch of 45° along three orbit planes, having eight satellites 1 per orbital plane A,B,C. In each plane the satellites are on circular orbits of about 20,000 km altitude, inclined relative to the plane of the Earth's equator by about 65°, with an orbital period of approximately 12 hours. The longitudes of the ascent angles of satellite paths in the various orbital planes differ by 120°;

a ground-based system (not shown in the figure) providing control of the orbiting system of satellites 1, which monitors the satellite performance and also loads each satellite with its precise ephemerides and correction factors to each satellite 1 time scale relative to a time scale adopted as the navigation system time scale;

system users 2, with appropriate equipment, receiving and processing navigation radio signals arriving from satellites 1 to define user positioning coordinates, motion speed, and correction factors for user's time scales.

At any instant and in any point on the Earth's surface at least four satellites 1 are in the zone of radio contact of a user 2. Correlation of the radio navigation signal from satellite 1 to the reference signal of user 2 receiver allows measurement of the pseudodistance and radial pseudospeed relative to the four selected satellites 1, reception of data from them and calculation of the user's coordinates, speed vector, and also the correction factor to the user's time scale relative to the adopted navigation system time scale.

On board each satellite 1 sinusoidal signals of a standard reference frequency are generated along with one-second time scale marks by the satellite 1 clock. They are used subsequently, as decribed herein below, to generate:

the carrier frequency, individual for each satellite 1;
modulating signal for each satellite 1.

Generation of the carrier frequency involves frequency synthesis and multiplication of the standard reference sine oscillations, and also power amplification of the generated carrier frequency oscillations.

Each satellite 1 of the system, or each pair of satellites 1 opposite one another on the orbital plane, is ascribed an individual carrier frequency value, with rated carrier frequencies varying by a multiple of 0.526 MHz from one satellite 1 to another satellite 1. Ascribing identical carrier frequencies to opposing satellites allows a twofold reduction of the frequency band occupied by the system, without sacrificing ony of the advantages of frequency selection of radio navigation signals. Indeed, simultaneous reception of radio navigation signals from two "antipodal" satellites 1 is possible only with the user 2 positioned at least 190 km above the Earth's surface, at lower altitudes reception is blanked out by the Earth's shadow. Consequently, most users 2 (ground-based, seafaring, aircraft-based) receive radio navigation signals of different frequencies only. Satellite-based users can easily filter out radio signals from "antipodal" satellites 1, arriving with equal frequencies with the aid of Doppler techniques or by noting the direction of their arrival.

Figure 2:
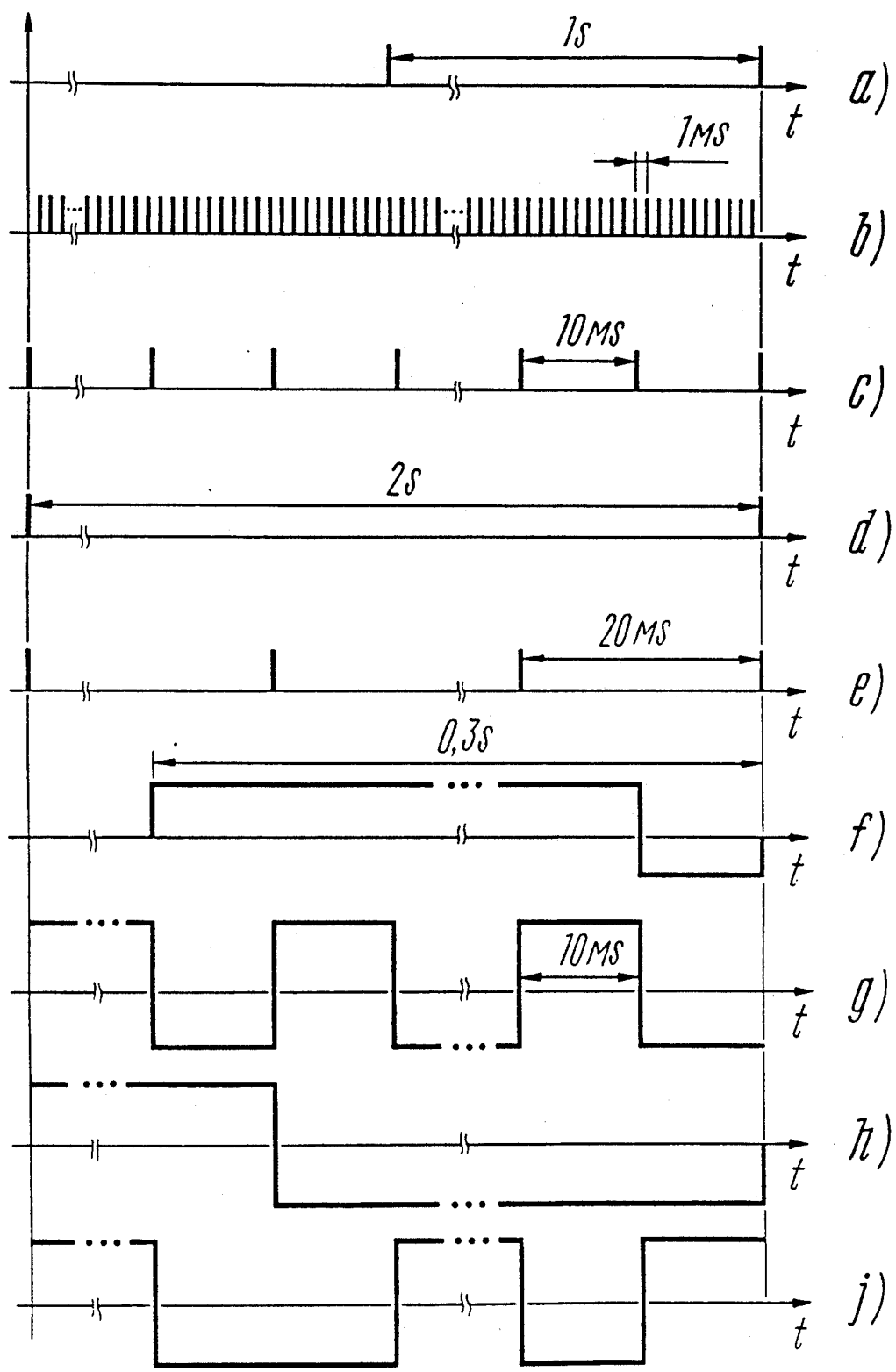
FIG. 2 shows the sequence diagrams illustrating the synchronization of components of the modulating signal to pulses of the one-second marks of the satellite clock, according to the invention.
Figure 3:
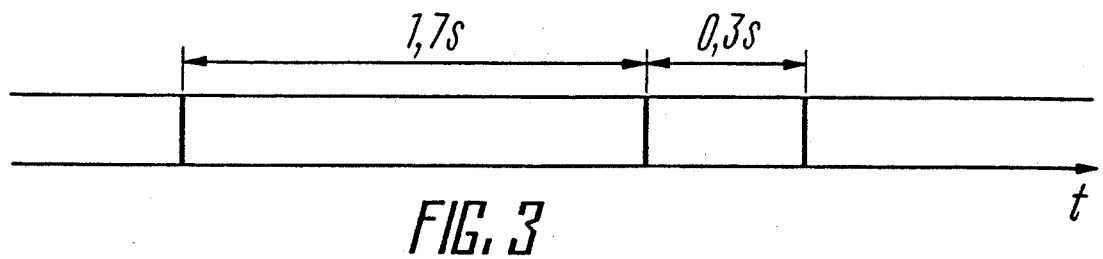
FIG. 3 shows two-second lines of a navigation message generated on board the satellite, according to the invention.

Modulating signal generation is illustrated in FIGS. 1, 2, 3. FIG. 1a shows one-second marks of the satellite 1 clock. Sinusoidal oscillations of the reference standard frequency are used to generate clock frequency (511 kHz) pulses of the M-sequence (FIG. 1b), thereafter serving to create elements of the M-sequence (FIG. 1c) and also a pulse train with a repetition rate of 1 kHz corresponding to the repetition period of the M-sequence (FIG. 1d). The M-sequence code may be generated, for instance, with the aid of a common shift register with feedback. The initial state of the shift register in the M-sequence generator is characterized by all positions of the register being filled with "one's". The M-sequence is used to measure user 2 pseudodistance to satellite 1.

The pulse train marking the start and end of the M-sequence repetition period (FIG. 2b) is used to generate symbol rate pulses of the dibit code (with a repetition rate of 100 Hz), the repetition period whereof is a multiple of the M-sequence period, FIG. 2c.

Appropriate division of the dibit-coded symbol rate pulses provides: time mark pulses, setting a 2-second repetition period of the synchronization code (FIG. 2d); navigation data symbol rate pulses (50 Hz, FIG. 2e); synchronization code symbols (FIG. 2f); and Manchester code symbols (FIG. 2g).

The synchronization code is a 30-symbol long sequence: 111110001101110101000010010110.

Data loaded to satellite 1 by the ground-based control system (not shown in the figure) is used to generate navigation data symbols synchronous with the pulses of navigation data symbol rate pulses (FIG. 2h).

Synchronization of all pulse sequences is acomplished with the aid of one-second mark pulses of the satellite 1 clock (FIG. 2a).

Dibit coding of the navigation data symbols is acomplished by modulo-two adding of Manchester code symbols and navigation data symbols (FIG. 2j).

Dibit navigation data symbols and synchronization code symbols are used to generate the navigation message (FIG. 3), 1.7 seconds of the "line" whereof is ascribed for navigation data dibits and the remaining 0.3 seconds—for the synchronization code.

The modulating signal is formed by modulo-two summation of the navigation message symbols and the elements of the M-sequence.

The radio navigation signal of satellite 1 is generated by modulating the carrier frequency with the modulating signal.

On reception of the radio navigation signal at the object-user 2a reference signal is generated, the local oscillator frequency whereof is selected in accordance with the number of sattelite 1. This reference signal is then used for correlation reception of the radio navigation signal, with subsequent measurement of the pseudodistance and pseudospeed of the object-user relative to satellites 1 and detection of the navigation data and time marks. All these findings are used as the basis of calculating the object-user positioning coordinates and motion speed, and also a correction factor for the object-user's 2 time scale.

Frequency division of radio navigation signals from the system satellites provides a number of benefits, as compared to coding division used in the abovecited Navstar radio navigation system. Frequency division implies different carrier frequencies of satellites 1 or groups of satellites 1 and a common to all satellites 1 ranging signal code, whereas with code division the common to all satellites 1 system parameter is the carrier frequency and the ranging signal code is individual for each satellite 1.

The large number of satellites 1 simultaneously present within the radio contact range of object-user 2 results in that, along with the useful radio signal from the satellite 1 with which communications are established at the given moment of time, the user receives interfering radio signals from the rest of the satellites 1 within his radio contact range. The level of such interfering signals is substantially dependent on the method of radio navigation signal division, adopted in the satellite-aided system.

With code division of radio navigation signals, the level of intersystem interference is defined by the magnitude of the side lobes of the cross-correlation function of the codes used, this latter depending on the code type and length of code combination.

In the cited herein above Navstar system radio navigation signals from different satellites 1 are discerned by the Gold code used to measure the pseudodistance, the length whereof is $L=1023$ elements. The maximum side lobe of the cross-correlation function for Gold codes of 1023 elements length at any magnitude of the Doppler shift constitutes about $7.10^{-3}$ of the useful signal ($-21.6$ dB).

The useful signal power at the receiver input can fall off by a factor of about 10 (10 dB) due to a serrated beam pattern of user's 2 antenna at low elevation angles, radio signal reflection from the underlying surface and from the object's structural elements, different distances from user 2 to the sources of useful signal and interfering signals, and other causes. Therefore, the signal/interference ratio at the input of user's 2 receiver can be about 14 (11.6 dB) in the presence of an interference signal from a single satellite 1. Since four to six satellites 1 are, as a rule, within the radio contact range of user 2 the signal/interference ratio can fall off to below 10 (10 dB), such a ratio being inadequate to provide reliable reception of radio navigation signals and consequently impairing the accuracy of navigation positioning.

In this case, the signal/interference ratio can be improved by using a loger code combination, this, however, leading to a longer radio navigation signal detection time. Using M-sequences as ranging codes, individual to each satellite 1, also provides no advantages, because the cross-correlation functions of M-sequences in characteristics approach those of Gold codes of like length.

It should be emphasized, that the discussed herein above interring signals are inherent to the system and due to the drawbacks of code division of radio navigation signals from satellites 1. The presence of other, extraneous to the system interference signals will but further hamper reception of useful radio navigation signals from satellites 1 of said Navstar system.

In case of frequency division of radio navigation signals, intersystem interference is determined mainly by the degree of overlapping of the frequency spectra of the useful and interfering signals at the front end of user's 2 receiver. A periodic M-sequence of 511 elements is selected as the ranging code. The level of side lobes of the autocorrelation function of a 511-element long M-sequence does not exceed about $4.10^{-6}$ in terms of power, and therefore their share in intersystem interference may be neglected.

The frequency diversity of 0.526 MHz between rated carrier frequencies is selected such, that interfering signals from satellites 1 within the radio contact range of user 2 can affect reception of the useful radio signal only by their second and higher side lobes of their spectra.

A single interfering signal can constitute but about $2.10^{-5}$ ($-47$ dB) of the useful signal power. With frequency division the number of interfering signals is usually not over two, all other signals from satellites 1 being filtered out in the receiver.

Thus, even at a tenfold reduction relative to its rated power of the useful signal being received, the signal/interference ratio in the user's 2 receiver will be about $2.5.10^3$ (34 dB), this being substantially higher than in the herein above cited Navstar system with code division of radio navigation signals.

Consequently, the radio navigation positioning method of this invention allows achieving a negligible level of intersystem interference without impairing the other major characteristics of the system.

Along with the herein above described advantage, frequency division of radio navigation signals from satellites 1 allows the use of shorter ranging codes, without degrading other system characteristics, and consequently reduce the radio navigation signal search time in the receiver of user 2.

A substantial advantage of the satellite-aided rario navigation positioning method of this invention is the use of dibit coding of navigation data symbols, this allowing reliable detection of data, independent of its statistical structure. Without dibit coding, the statistically non-uniform distribution of "one's" and "zeroes" in the digital stream hampers detection of the symbol limits, whereas transmission of uniform data (only "1" or only "0") makes this operation impossible. The herein above cited Navstar system does not use dibit coding.

Figure 4:
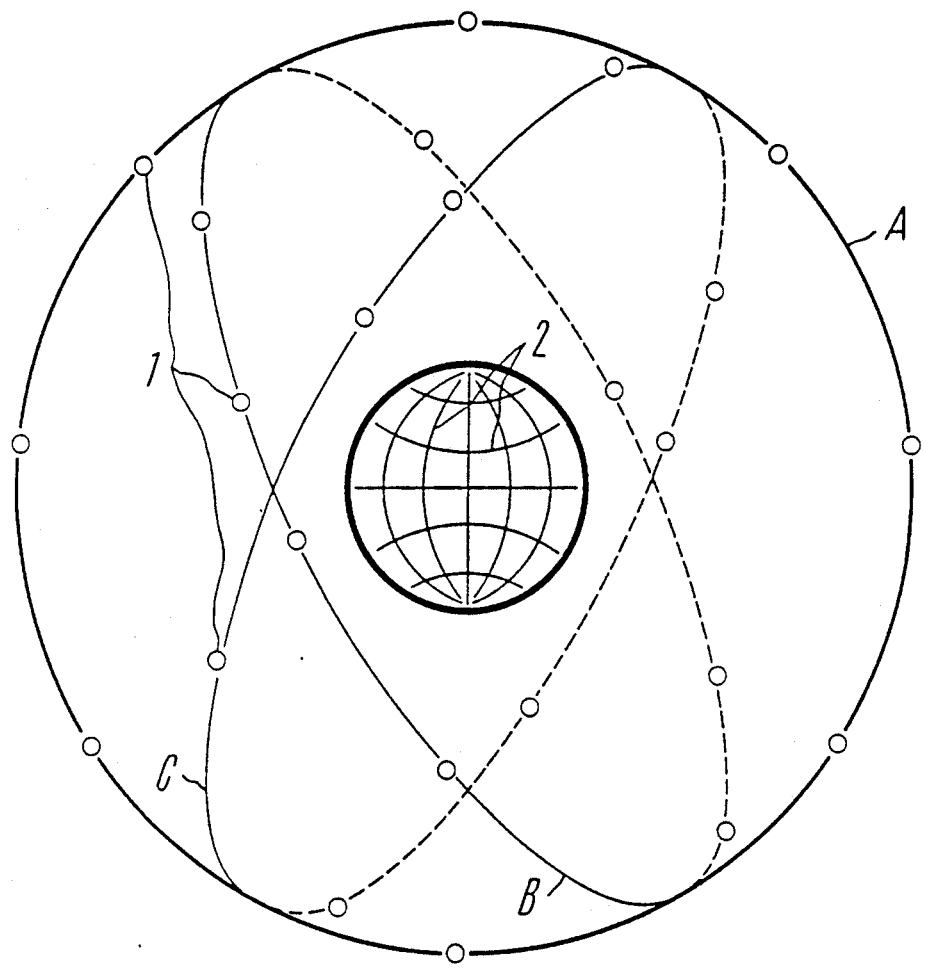
FIG. 4 is a schematic illustration of the satellite-aided radio navigation system in general.

FIG. 4 schematically illustrates a satellite navigation system, wherein 24 satellites 1 are on orbits in three orbital planes A,B,C, eight satellites per each orbital plane. The orbital planes are displaced one relative to another along the equator by 120° and inclined to the equator plane by 65°; the orbital period of satellites 1 is 12 hours. User 2 at any site on Earth or near it has at least four satellites 1 within his radio contact range simultaneously.

The radio navigation system functionally comprises a radio navigation signal generating and transmitting subsystem on board satellites 1, a radio navigation signal reception and processing subsystem at object-user 2, and a control center (not shown in the drawings not falling within the scope of this invention) to monitor and control satellites 1.

Figure 5:
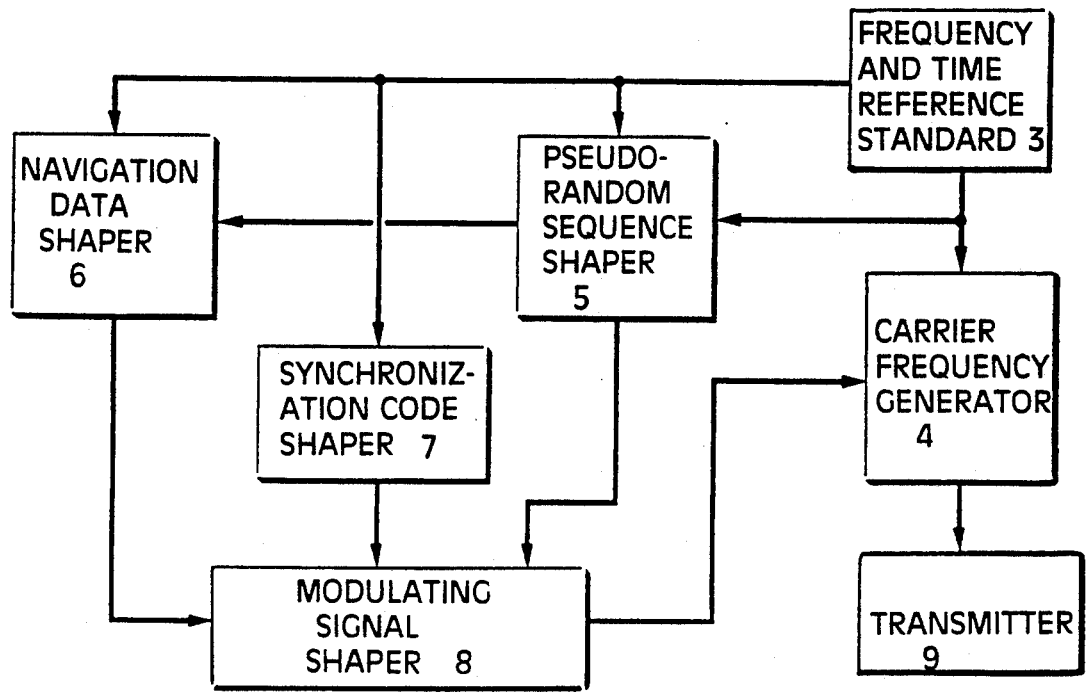
FIG. 5 is a schematic illustration of the radio navigation signal generating and transmitting subsystem on board of each satellite.

FIG. 5 schematically illustrates the major components of the radio navigation signal generating and transmitting subsystem, these including frequency and time reference standard 3, carrier frequency generator 4, pseudorandom sequence shaper 5, navigation data shaper 6, synchronization coder shaper 7, modulating signal shaper 8, and transmitter 9. A more detailed description of the functioning of this radio navigation signal generation and transmission subsystem is presented herein below.

Figure 6:
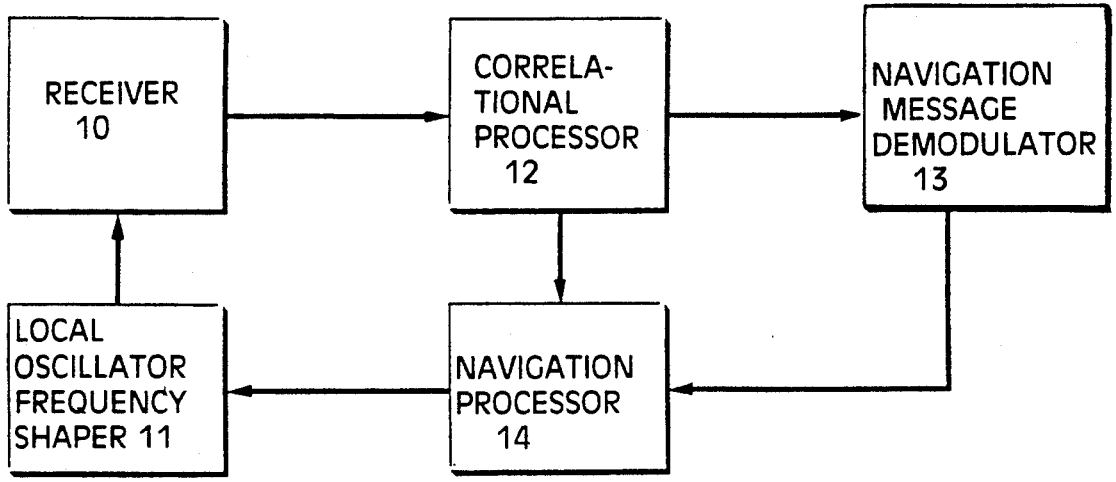
FIG. 6 is a schematic illustration of the radio navigation signal reception and processing subsystem at each object-user.

FIG. 6 schematically shows the major components of the radio navigation signal reception and processing subsystem, these comprising receiver 10, local oscillator frequency shaper 11, correlational processor 12, navigation message demodulator 13, and navigation processor 14. A more detailed description of the functioning of the radio navigation signal reception and processing subsystem is presented herein below.

Figure 7:
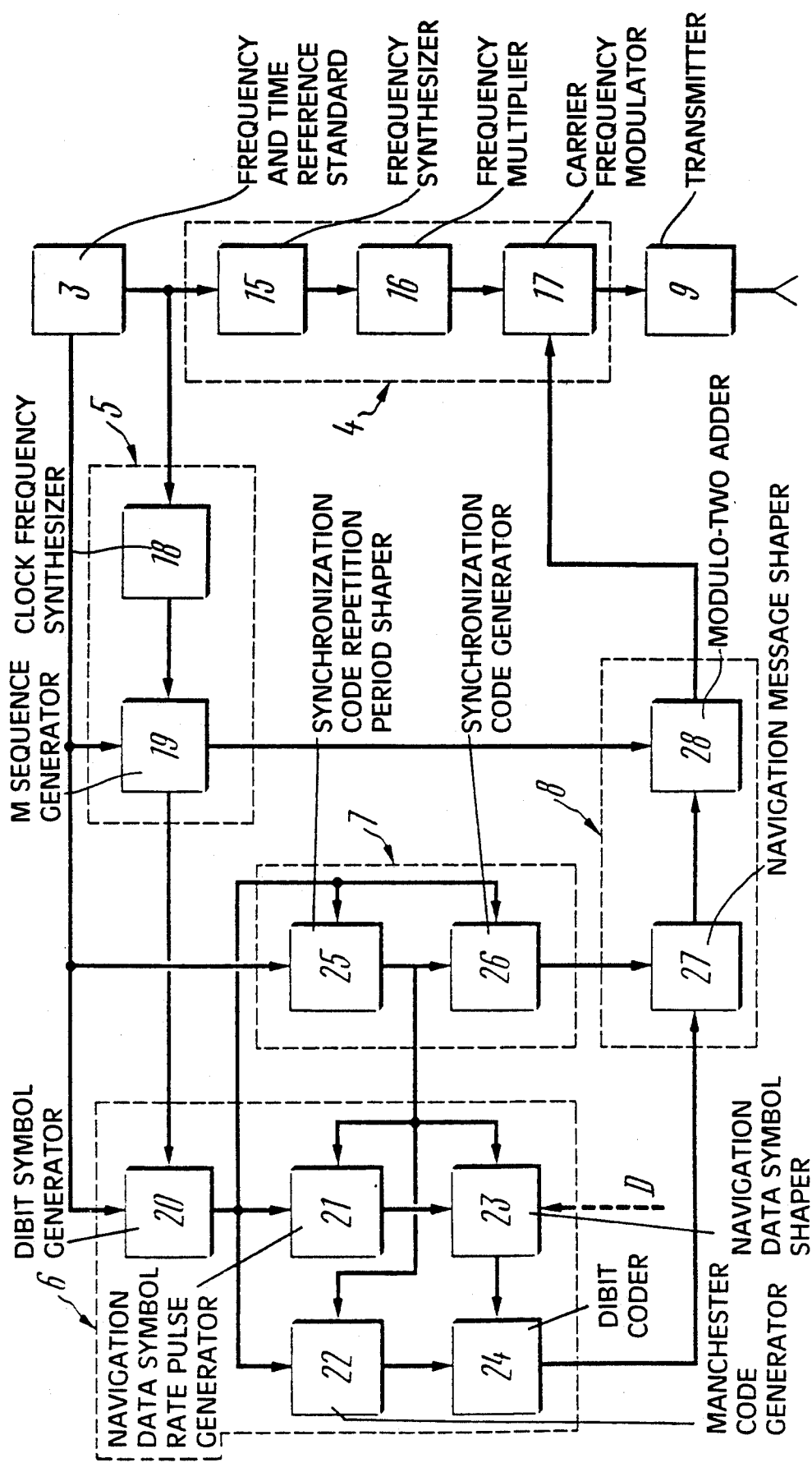
FIG. 7 shows the functional block diagram of the radio navigation signal generating and transmitting subsystem, according to the invention.

FIG. 7 shows a detailed functional block diagram of the radio navigation signal generation and transmission subsystem.

The frequency and time reference standard 3 comprises a precise primary frequency standard and the satellite clock (not shown).

The output signals of standard 3 are used to obtain all the frequency and time parameters of the radio navigation signal.

The first output of standard 3 is driven by the output of the primary frequency standard and is connected to the input of frequency synthesizer 15 to produce a harmonic oscillation of a frequency ascribed to the given satellite 1. Synthesizer 15 can be designed with direct or indirect synthesis techniques, as well as with hybrid circuit arrangements. Such designs are widely known and are described in detail, for instance in the book "Frequency Synthesizers. Theory and Design" by V. Manassewitch (A Wiley-Interscience Publication, John Wiley & Sons, New York-London-Sydney-Toronto). Frequency synthesizer 15 is connected to the first input of carrier frequency modulator 17 via frequency multiplier 16, this latter serving to translate the output signal of frequency synthesizer 15 into the decimeter wave band. Carrier frequency modulator 17 provides binary phase-shift keying of the carrier frequency arriving from the output of frequency multiplier 16, and its design is also widely known in the art. The frequency synthesizer 15, frequency multiplier 16 and carrier frequency modulator 17 conjointly constitute carrier frequency shaper 4, the value whereof is ascribed individually to each satellite 1. The output of modulator 17 drives transmitter 9, which includes a power amplifier and the transmitting antenna (both not shown in the drawing).

At the same time, the first output of frequency and time standard 3 is connected to the input of clock frequency synthesizer 18, which generates the clock frequency for the M-sequence. Synthesizer 18 can be designed with circuitry similar to that of synthesizer 15 in the carrier frequency shaper 4.

The output of clock frequency synthesizer 18 is connected to the first input of M-sequence generator 19, the second input whereof is connected to the second output of frequency and time standard 3, which drives the satellite clock. Generator 19 generates the M-sequence itself, and also pulses with a repetition rate equal to that of the M-sequence period. The circuit arrangements used in M-sequence generators are based on linear shift registers with feedback are widely known in the art and are described, for instance, in "Digital Communications by Satellites" by I. I. Spilker (Prentice-Hall, Inc., Englewood Cliffs, N.J., 1977).

The connected in series clock frequency synthesiszer 18 and M-sequence generator 19 constitute the pseudorandom sequence shaper 5.

The first output of M-sequence generator 19 is connected to the first input of dibit symbol rate pulse generator 20, the second input whereof is connected to the second output of frequency and time standard 3. Dibit symbol rate pulse generator 20 converts the repetition rate of the M-sequence period into the symbol rate of the dibit code, simultaneously used as the synchronization code symbol rate. Generator 20 is essentially a common frequency divider, the design whereof is widely known in the art.

The output of dibit symbol rate pulse generator 20 is at the same time connected to the first inputs of navigation data symbol rate pulse generator 21 and Manchester code generator 22. Navigation data symbol rate pulse generator 21 converts the symbol rate of the dibit code by dividing it by two, this producing the navigation data symbol rate, and can be designed as a common flip-flop. The Manchester code generator 22 generates a train of binary symbols of the Manchester code from the symbol rate of the dibit code and can also be implemented with a flip-flop.

The output of navigation data symbol rate generator 21 drives the first input of navigation data symbol shaper 23. The navigation data includes the given satellite ephemerids and clock, along with other useful data, such as the system log. Shaper 23 is a processor, the design principles and circuit configurations whereof are widely known in the art. The output of this shaper is connected to the first input of dibit coder 24, the second input whereof receives the Manchester code from generator 22. Dibit coder 24 executes modulo two adding of navigation data symbols and Manchester code symbols.

The principles governing this operation are known in the art and can be implemented, for instance, with an "exclusive OR" logic gate. Dibit symbol rate pulse generator 20, navigation data symbol rate pulse generator 21, Manchester code generator 22, navigation data symbol shaper 23, and dibit coder 24 conjointly constitute navigation data generator 6.

The output of dibit symbol rate generator 20 is also connected to the first inputs of synchronization code repetition period shaper 25 and synchronization code generator 26. The second input of synchronization code period shaper 25 is driven from the second output of frequency and time standard 3, this resulting in two-second time marks at the output thereof. This shaper is essentially a frequency divider, similar to those described herein above. The output of shaper 25 is connected to the second input of synchronization code generator 26 and also to the second inputs of navigation data symbol rate pulse generator 21, Manchester code generator 22, and navigation data symbol shaper 23 in navigation data generator 6. Synchronization code generator 26 is an M-sequence generator, the design configuration whereof, as stated herein above, is common knowledge. The synchronization code period shaper 25, and the synchronization code generator 26 conjointly constitute synchronization code shaper 7.

The output of synchronization code generator 26 is connected to the second input of navigation message shaper 27, the first input whereof is connected to the output of dibit coder 24. Navigation message shaper 27 is embodied with a logic AND gate, the function whereof is to assemble dibit-coder navigation data symbols and the synchronization code into a navigation message. The output of navigation message shaper 27 is connected to the first input of modulo-two adder 28, the second input whereof is connected to the second output of M-sequence generator 19. Modulo-two adder 28 is embodied with an exclusive OR gate and, in conjunction with navigation message shaper 27, constitutes modulating signal shaper 8. The output of modulo-two adder 28 drives the second input of carrier frequency modulator 17 in carrier frequency shaper 4.

The radio navigation signal generation and transmission subsystem functions as follows.

Highly stable sinusoidal oscillations from the first output of frequency and time standard 3 arrive at the input of frequency synthesizer 15, wherein a signal of a frequency typical of the given satellite 1 is generated. This signal is then translated into the decimeter-wave band and thus constitutes the unmodulated carrier frequency $f_{cj}$ of the radio navigation signal of this given satellite 1 (where j is the number of this given satellite 1 in the positioning system). Carrier frequency $f_{cj}$ is then submitted to binary phase shift keying by 0°=180° by the modulating signal in the carrier frequency modulator 17, thus constituting the radio navigation signal continuously emitted by the output of transmitter 9.

Transmission of radio mavigation signals by satellites 1 of the system with different, individual carrier frequencies (ascribed to each satellite or to a pair of "antipodal" satellites) allows a drastic reduction of intersystem interference generated in the radio navigation signal reception and processing subsystem due to the arrival simultaneously of signals from several satellites 1 within the radio contact range and distortions of the receiving antenna beam pattern under actual operating conditions at the object-user 2 site. This also allows reduction of the number of elements in the general pseudorandom sequence, common for all satellites 1, while retaining high autocorrelation properties. This, in turn, allows a shorter time to synchronize the copy of the pseudorandom sequence to the pseudorandom sequence being received by the radio navigation signal reception and processing subsystem, this synchronization time being directly dependent of the number of elements in the sequence.

Sinusoidal oscillations from the first output of frequency and time standard 3 are also passed to the input of clock frequency synthesizer 18, wherein they are used to generate the clock frequency 0.511 MHz (FIG. 1b), applied to the first input of M-sequence generator 19. This input is the clock input of a linear shift register with feedback, which is a component part of generator 19. Generator 19 is designed with a 9-bit shift register and implements the primitive polynomial $G(x)=1 \oplus x^5 \oplus x^9$. The M-sequence generated features the following parameters: number of elements (length) L=511, clock frequency of element transfer 0.511 MHz, repetition period of the M-sequence 1 ms (equal to the sequence length divided by the clock frequency).

The use of an M-sequence of 511 elements length allows a two-fold reduction of the time to synchronize the pseudorandom sequence copy to the sequence being received, with element-by-element search for the peak autocorrelation, as compared to the cited herein above Navstar system, which uses Gold's codes with a number of elements L=1023.

The second input of M-sequence generator 19 receives one-second time mark pulses of the satellite clock from the second output of frequency and time standard 3 (FIG. 1a). These pulses set the shift register and thus provide initial synchronization of generator 19. The M-sequence generated (FIG. 1c) is passed to the second output generator 19. Besides the M-sequence, generator 19 generates pulse trains with a repetition rate equal to that of the M-sequence period, i.e. 1 kHz, as shown in FIG. 1d. These pulses coincide with the start of the M-sequence, and thus with the initial state of the shift register, at which all its positions are filled with "1's".

The 1 kHz signal from the first output of M-sequence generator 19 is passed to the first input of dibit symbol rate pulse generator 20, wherein the input frequency 1 kHz is divided by 10, with initial synchronization of the frequency divider provided by one-second mark pulses from the second output of frequency and time standard 3 arriving at the second input of dibit symbol rate pulse generator 20. The resulting pulse train with a repetition rate of 100 Hz (FIG. 2c) defines the rate of dibit symbols and synchronization code symbols, so that the duration of these symbols is 10 ms. The pulse train with a repetition rate of 100 Hz from the output of dibit symbol rate pulse generator 20 is passed simultaneously to the first inputs of navigation data symbol rate pulse generator 21 and Manchester code generator 22, and also to the first inputs of synchronization code repetition period shaper 25 (FIG. 2d) and synchronization code generator 26 (FIG. 2f), with the former providing a repetition period of 2 seconds.

In navigation data symbol rate pulse generator 21 the input frequency 100 Hz is divided by two, thus producing a 50 Hz frequency to define the rate of binary symbols of navigation data with a duration of 20 ms, as shown in FIG. 2a. The 50 Hz symbol rate pulses from the output of generator 21 arrive at the first input of navigation data symbol shaper 23 and are used to read 20-millisecond navigation data symbols generated by the satellite's processor (FIG. 2h). Navigation data generation from the information loaded into the processor memory from the ground-based station is described in detail in A. I. Van Dierendonck et al., "The GPS Navigation Message", Navigation (U.S.A.), 1978, vol. 25, No. 2.

The Manchester code generator 22 generates a Manchester code from the 100 Hz dibit symbol rate pulses; the Manchester code is generated is a square wave with a repetition rate of 50 Hz and a 20 ms period, as shown in FIG. 2g. The Manchester code is modulo-two added to binary symbols of navigation data in dibit coder 24, this producing recoding of the navigation data binary symbols with a repetition rate of 50 Hz and 20 ms duration into dibit-coded symbols with a repetition rate of 100 Hz and 10 ms duration, as shown in FIG. 2j.

Dibit coding povides a practically uniform distribution of transitions from "1's" to "0's" and vice versa, including the case of transmitting long files of navigation data with symbols of predominantly one kind.

This facilitates symbol synchronization in the radio navigation signal reception and processing subsystem, and consequently allows a shorter synchronization time.

The functioning of navigation data symbol rate pulse generator 21, Manchester code generator 22, and navigation data symbol shaper 23 is synchronized by pulses of two-second time marks arriving at the second inputs of said devices from the output of synchronization code repetition period shaper 25, wherein the dibit symbol rate 100 Hz is divided by two hundred, with the initial synchronization of the frequency divider is set by pulses of one-second time marks from the second output of frequency and time standard 3. The result is pulses with a repetition period of 2 seconds at the output of shaper 23, synchronous with one-second time mark pulses of the satellite clock, as shown in FIG. 2d. There two-second pulses define the synchronization code repetition period. The synchronization code is a truncated M-sequence of thirty 10-millisecond symbols, with a total duration of 0.3 second, recurring once every 2 seconds, and having the pattern 111110001101110101000010010110. This M-sequence is generated by synchronization code generator 26 during a time interval set by an authorization pulse, locked to the two-second time mark pulse and arriving from the output of synchronization code repetition period shaper 25. This M-sequence is generated with the aid of a 5-bit shift register with feedback, implementing the primitive polynomial $G(x)=1\oplus x^3\oplus x^5$. Pulses of the 100 Hz repetition rate from the output of dibit symbol generator 20 are used as the clock frequency for M-sequence generation and are applied to the first input of synchronization code generator 26. The primitive polynomial presented herein above generates a 31 symbol long M-sequence, so that the last, 31-st symbol is omitted. On the time scale, generation of this M-sequence is timed in such a way, that the trailing edge of the 30-th symbol coincides with the pulse of the two-second time mark, as shown in FIG. 2f, this providing accurate timing of the synchronization code to rhoments of time, corresponding to even seconds of the satellite time scale.

The synchronization code from the output of synchronization code generator 26 is passed to the second input of navigation message shaper 27, the first input whereof receives dibit symbols from the output of dibit coder 24. Message shaper 27 continuously assembles two-second sections (lines) of the navigation message, wherein the first 1.7 seconds of the line are used to transmit 170 dibit-coded symbols and the remaining 0.3 seconds are used to transmit 30 symbols of the synchronization code, as shown in FIG. 3. Synchronization code transmission every two can be designed similar to the discussed herein above frequency synthesizer 15 in the radio navigation generation and transmission subsystem. The assemblage of oscillator 29 and frequency synthesizer 30 constitutes local oscillator (heterodyne) frequency shaper 11.

The output of frequency synthesizer 30 drives the input of receiver front end 10A, which is designed with well known in the art components, such as the receiving antenna, low-noise input preamplifier, down converter, intermediate frequency amplifier (not shown in the drawing), to provide amplification of the received radio signal and its conversion into an intermediate frequency or video signal.

The output of receiver front end 10A is simultaneously connected to the inputs of pseudorandom sequence delay search and track unit 31 and carrier frequency search and track unit 32, both units designed using the well known in the art phase-lock loop technique, as described in detail in "Synchronization Systems in Communications and Control" by William C. Lindsey (Prentice-Hall, Inc., Elglewood Cliffs, N.J., 1972). These units constitute correlation processor 12.

The first output of carrier frequency search and track unit 32 drives the input of dibit symbol rate pulse detector 33 and the first inputs of synchronization code and time mark detector 34 and dibit code detector 35. Dibit symbol rate pulse detector 33 is the known in the art symbol synchronization circuit enabled by data on symbol polarity reversal and described, for instance, in "Digital Communications by Satellite" by I. I. Spilker (Prentice-Hall, Inc., Englewood Cliffs, N.J., 1977). The output of detector 33 is connected to the second inputs of synchronization code and time mark detector 34 and dibit code detector 35.

Synchronization code and time mark detector 34 is a matched filter designed to recognize and detect the synchronization code and related two-second time mark; seconds, i.e. 3 times rarer than in the discussed herein above Navstar system, allows a shorter time span in the radio navigation signal reception and processing subsystem to analyse the validity of time mark detection and set the start of navigation data readout. Forthermore, increasing the synchronization code capacity (to 30 symbols) enhances the probability of valid detection of the synchronization code and also reduces the probability of false assemblage of the synchronization code from the symbols of navigation data received. This allows reduction of the number of repeated cycles of synchronization code reception necessary for verification of valid code reception, and thus further reduces the time of synchronizing the start of navigation data readout.

The navigation message in the form of an assemblage of dibit-coded symbols and synchronization code symbols from the output of navigation message shaper 27 is passed to the first input of modulo-two adder 28, the second input whereof receives a signal of the ranging M-sequence from the second output of generator 19, this resulting in a modulating signal at modulo-two adder 28 output, passed to the control input of modulator 17 to produce binary phase-shift keying of the carrier frequency of the radio navigation signal.

Figure 8:
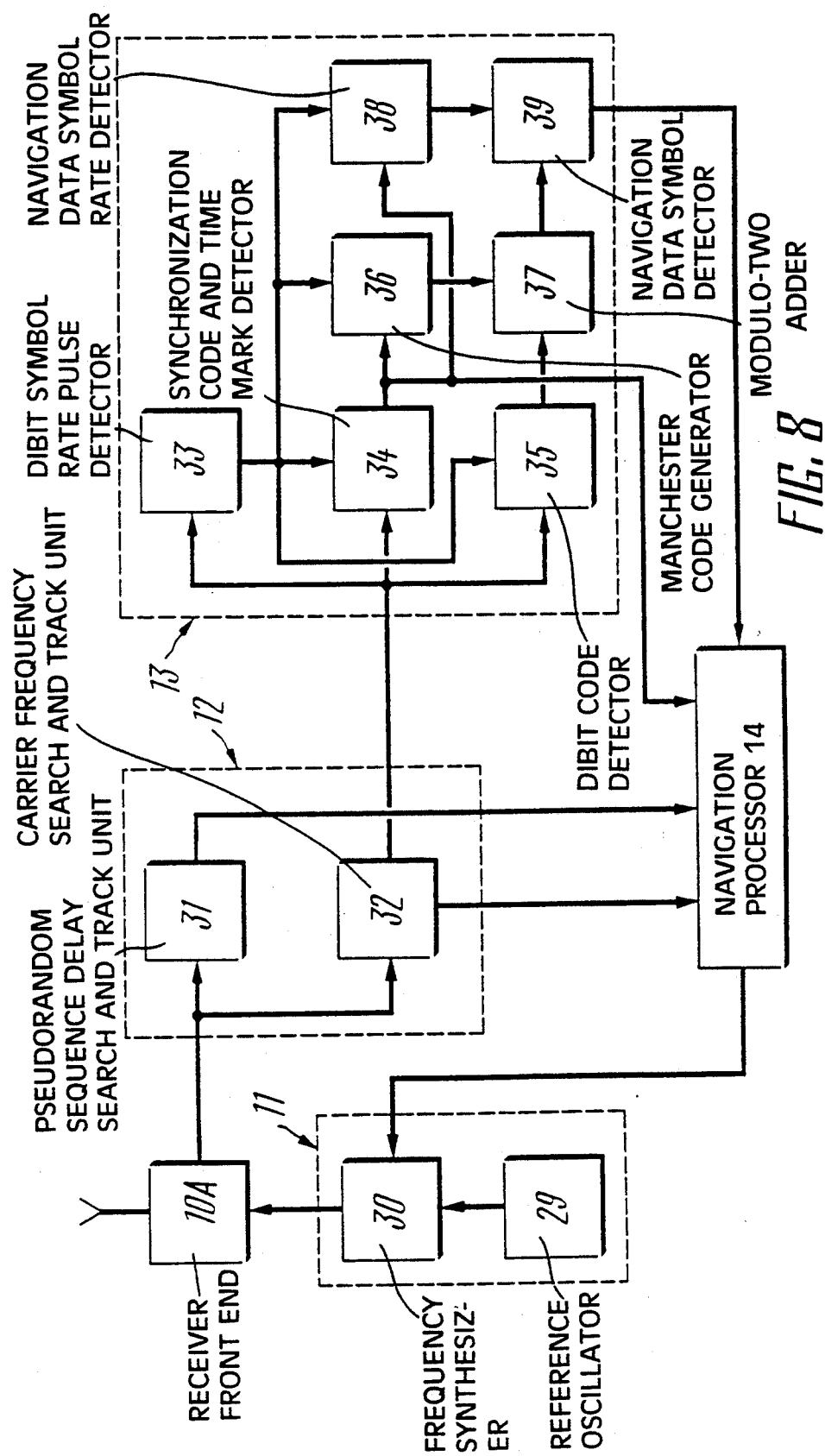
FIG. 8 shows the functional block diagram of the radio navigation signal reception and processing subsystem, according to the invention.

FIG. 8 illustrates the functional block diagram of the radio navigation signal reception and processing subsystem at object-user 2.

Reference oscillator 29 generates a signal of standard frequency. The reference oscillator may be designed, for instance, with the widely known in the art crystal frequency standards, or atomic time standards. The output of reference oscillator 29 drives the first input of frequency synthesizer 30, wherein this signal is used to produce a local oscillator frequency according to the number of satellite 1, the radio navigation signal whereof is being currently received. Frequency synthesizer 30 its functioning and possible embodiments are discussed herein below.

Dibit code detector 35 is intended to provide integrated processing of dibit-coded symbols and may be embodied with a resettable integrator linked to a threshold device, the circuit configuration of both being well known in the art.

The output of dibit symbol rate pulse detector 33 is also connected to the first inputs of Manchester code generator 36 and of navigation data rate pulse detector 38, the second inputs whereof receive the output signal of synchronization code and time mark detector 34.

The function of Manchester code generator 36 here is the same as that of the described herein above Manchester code generator 22 in the radio navigation signal generation and transmission subsystem, and consits in generating binary Manchester coded symbols out of the pulses of dibit symbol rate. Functions executed by navigation data symbol rate detector 38 are similar to those of navigation data symbol rate pulse generator 21 in the radio navigation signal generation and transmission subsystem and consist in dividing by two the dibit symbol rate. The output of Manchester code generator 36 is connected to the second input of modulo-two adder 37, the first input whereof is driven by the output signal of dibit code detector 35. The function of modulo-two adder 37 is the same as that of dibit coder 24 in the radio navigation signal generation and transmission subsystem.

The output of modulo-two adder 37 is connected to the first input of navigation data symbol detector 39, the second input whereof receives the output signal of navigation data symbol rate pulse detector 38. Similar to dibit code detector 35, navigation data symbol detector 39 may be embodied with a resettable integrator linked to a threshold device. The assemblage of dibit symbol rate pulse detector 33, synchronization code and time mark detector 34, dibit code detector 35, Manchester code generator 36, modulo-two adder 37, navigation data symbol rate pulse detector 38, and navigation data symbol detector 39 constitutes navigation message demodulator 13, the output signals whereof are the two-second time mark pulse and the binary symbols of the navigation message.

Navigation processor 14 executes the necessary navigation calculations and has its first input connected to the output of pseudorandom sequence delay search and track unit 31, its second input connected to the second output of carrier frequency search and track unit 32, its third input connected to the output of navigation data symbol detector 39, its fourth input connected to the output of synchronization code and time mark detector 34. The output of navigation processor 14 is connected to the second input of frequency synthesizer 30. The circuit design and principles of functioning of navigation processor 14 are generally known in the art.

The radio navigation signal reception and processing subsystem functions as follows.

Sinusoidal oscillations from the output of reference frequency oscillator 29 are passed to the first input of frequency synthesizer 30, wherein they are converted into local oscillator frequency $f_{hj}$ signals, this frequency specified by the number of the desired satellite 1. The command code to synthesize the required local oscillator frequency, corresponding to the given satellite 1 number, arrives at the second input of frequency synthesizer 30 from the output of navigation processor 14.

The radio navigation signal received from the given satellite 1 is amplified, down-converted by mixing with the local oscillator frequency from the output of frequency synthesizer 30, and converted into intermediate frequency signals or video signals in the receiver front end 10A. The output signal may be analogue or converted to digital, for instance with the aid of an analogue-to-digital converter.

After amplification, the down-converted signal is passed simultaneously to the inputs of pseudorandom sequence delay search and track unit 31 and of carrier frequency search and track unit 32 for correlation processing of the radio navigation signal.

Pseudorandom sequence delay search and track unit 31 provides synchronization of the M-sequency copy generated in this unit to the M-sequence being received by searching for and tracking the peak autocorrelation corresponding to the instant of coincidence of the codes of the M-sequence and its copy with an error of not over ±1 code element. The presence of peak autocorrelation, on signal detection, can be analysed both serially (by-element) and in parallel (multielement), by multiplying the M-sequence copy by the received M-sequence. On establishing this synchronization unit 31 tracks the delay of the M-sequence, this producing an output signal indicating the pseudodistance. At the same time, the carrier frequency search and track unit 32 provides frequency and phase synchronization, and after this tracks the carrier frequency phase, as a rule with the aid of the known in the art Kostas circuit arrangement. Tracking the carrier frequency phase produces two output signals, one indicative of the radial pseudospeed and the other constituting the coherent-detected navigation message signal.

The navigation message in the form of a continuous stream of symbols distorted by noise is passed from the first output of carrier frequency search and track unit 32 to the first inputs of synchronization code and time mark detector 34 and dibit code detector 35, and also to the input of dibit symbol rate pulse detector 33.

Detector 33 uses data on instants of arriving symbol polarity reversal to establish symbol synchronization and detect pulses of dibit-coded symbol rate, 100 Hz, which are synchronous with the limits of the 10-millisecond symbols. These pulses are passed from the output of detector 33 to the second inputs of synchronization code and time mark detector 34 and dibit code detector 35, to be used for setting individual integration intervals (10 ms) of noise-distorted symbols arriving at the first inputs of these detectors. After integration, the received symbols are used in the synchronization code and time mark detector 34 for matched filtration of the received synchronization code, this producing a pulse synchronous with the trailing edge of the thirtieth synchronization code symbol and coinciding with the two-second time mark.

The time mark pulse from the cutput of synchronization code and time mark detector 34 arrives at the second inputs of Manchester code generator 36 and of navigation data symbol rate pulse detector 38, the first inputs whereof receive 100 Hz pulses of the dibit symbol rate from the output of detector 33. Manchester code generator 36 uses the 100 Hz pulses to generate the Manchester code, whereas detector 38 shapes 50 Hz pulses of the navigation data symbol rate.

The Manchester code signal from the output of generator 36 is passed to the second input of modulo-two adder 37, the first input whereof receives 10-millisecond dibit-coded symbols after their integration in dibit code detector 35. The result of modulo-two summation in adder 37 is the restoration of binary symbols of the navigation data from dibit-coded symbols and Manchester code symbols. The resulting binary symbols are passed for additional intergrated processing to the first input of navigation data symbol detector 39. The 20 ms integration interval of these symbols is set by pulses of the navigation data symbol rate, arriving at the second input of detector 39 from the output of detector 38.

The output signal of navigation data symbol detector 39 in the form of a stream of filtrated navigation data symbols arrives at the third input of navigation processor 14, the first input whereof receives the pseudodistance signal from the output of pseudorandom sequence delay search and track unit 31 and the second input whereof receives the radial pseudospeed signal from the second output of carrier frequency search and track unit 32. The fourth input of navigation processor 14 is gated by the two-second time mark pulse arriving from the output of synchronization code and time mark detector 34.

Navigation processor 14 sets the start of navigation data readout on each two-second time interval by the two-second time mark pulse, decodes the data transmitted by binary symbols of the navigation data, manages measurements of pseudodistance and radial pseudospeed, and thereafter solves the navigation problem. An example of such a navigation problem solution is presented in "A Navigation Algorithm for the Low-Cost CPS Receiver" by P. S. Noe et al. (Navigation (U.S.A.), 1978, vol. 25, No. 2).

Solution of the navigation problem provides the coordinates and speed of motion of the object-user, and also correction factor of the local time scale.

Figure 9:
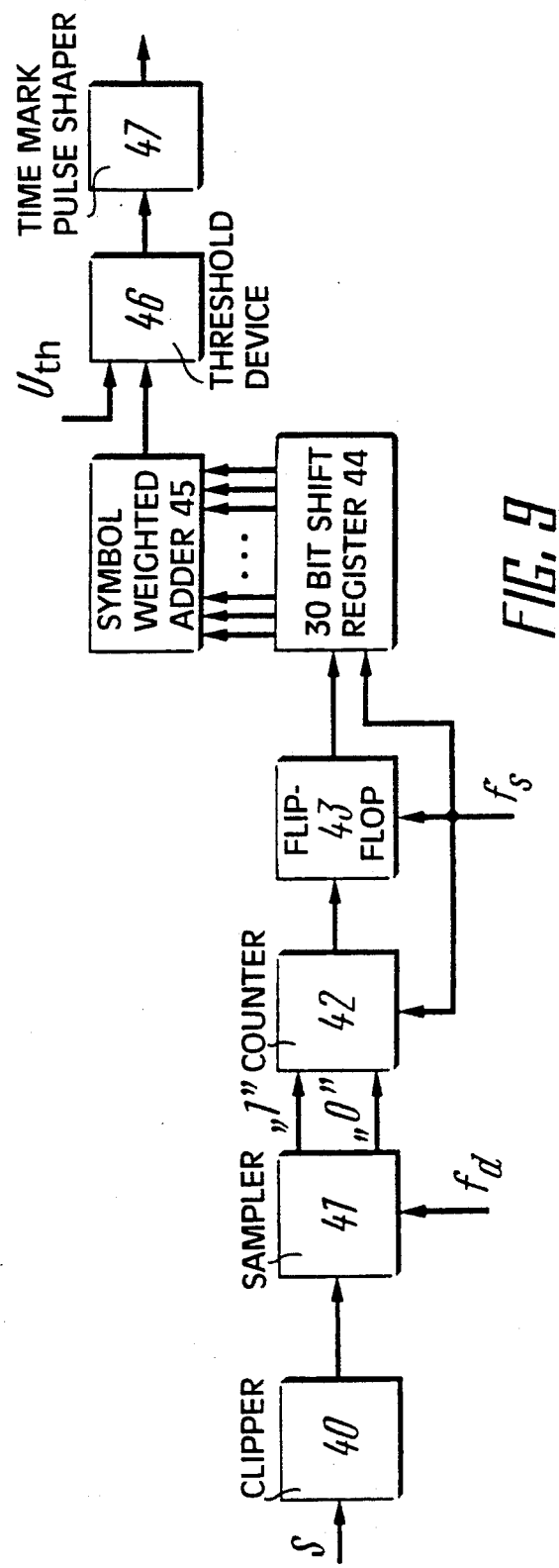
FIG. 9 shows an embodiment of the matched filter used to receive the synchronization code and detect two-second time marks.

In conclusion, the functioning and possible embodiments of the matched filter shall be discussed in some detail; this filter provides detection of the synchronization code and related two-second time mark in detector 34. Filtration of this kind is based on the difference of symbol sequences of the synchronization code and dibit code. FIG. 9 shows a possible embodiment of a digital-/analogue matched filter, implementable in cases when the navigation message signal at the first output of the carrier frequency search and track unit is an analogue signal.

As mentioned herein above, the input signals for the matched filter are the navigation message signal in the form of a continuous stream of noise-distorted symbols and 100 Hz pulses of the dibit symbol rate from the output of detector 33.

Prior to being passed to the matched filter, the input signal and noise mixture is submitted to integration processing. To this end the navigation message signal S is amplitude-limited in amplifier-clipper 40 and thereafter sampler 41 polls the signal polarity with an $f_d$ sampling rate.

Reversible and resettable counter 42 is used as the integrator. This reversible counter 42 counts the number of "1's" and "0's" arriving from the output of sampler 41 during a time interval equal to the navigation message symbol duration $T_s=10$ ms. Prior to reset at the end of the integration interval, i.e. at the end of the symbol duration, deciding flip-flop 43 polls the status of the most significant bit in reversible counter 42 and makes a decision about the symbol being transmitted on the basis of the majority of samples accumulated during the integration interval. To minimize losses with two-level quantization (sampling) of the input process, the sampling rate is selected substantially higher than the symbol rate of the dibit code, i.e. $f_d \geq 100$ Hz. The capacity of the reversible counter 42 should be $$2^{N-1} \geq f_d/f_s,$$

where N is the counter capacity and $f_s$ is the symbol rate of the dibit code.

The synchronization code matched filter comprises a 30-bit shift register 44, symbol-weighted adder 45, threshold device 46, time mark pulse shaper 47. The ten-millisecond symbols detected by deciding flip-flop 43 are serially entered into shift register 44 with a clock rate of 100 Hz. Analysis of data entered is performed on each cycle, i.e. at the end of each 10 ms time interval, with the aid of the symbol-weighted adder 45. The synchronization code features a specific sequence of symbol alteration, so that connection of the outputs of 30-bit shift register 44 to the countup and countdown inputs of symbol-weighted adder 45, according to symbol alternation in the synchronization code, generates a synchronization code pattern, as required by the matched code filter. Symbol-weighted adder 45 may be embodied on the basis of the widely known in the art summing/subtracting operational amplifier.

Coincidence of the code combination entered into shift register 44 with the code pattern at the input of symbol-weighted adder 45 causes a maximum voltage (autocorrelation peak) at its output, passed thereafter to threshold device 46 for comparison to threshold voltage $U_{th}$. Threshold device 46 is enabled by voltages exceeding $U_{th}$, this causing time mark pulse shaper 47 to generate a pulse synchronous with the trailing edge of the last, 30-th symbol of the synchronization code and constituting the two-second time mark.

It should be noted, that other embodiments of matched synchronization code filtration, including digital filtering, are also feasible, with the aid of hardware and/or purely software means using a processor.

Industrial Applicability

The satellite-aided navigation system of the invention allows:

a higher probability of navigation positioning with the accuracy specified at any instant of time by practically excluding the effects of intersystem interference at the site of reception of the radio navigation signals, independent of the environment-induced variations of the receiving antenna beam pattern;

substantial improvement of real time navigation positioning by reducing the time to establish communications with the satellite's radio navigation signals.

We claim:

1. A method for radio navigation positioning with the aid of satellites on several orbital planes (A,B,C), each satellite (1) having an individual number and comprising:

a) generating a carrier frequency from a sinusoidal signal generated by a frequency and time standard, said carrier frequency being unique for each said satellite or for each pair of mutually opposite satellites in an orbital plane;

b) modulating said carrier by a set of signals including an M-sequence pseudorandom sequence common to all of the radio navigation signals generated by each of said satellites and dibit coded signals representing navigation data and a synchronization code;

c) receiving said signal by a receiver at an object-user, each said receiver generating a reference signal the heterodyne frequency thereof being selected according to the carrier frequency of the transmitting satellite desired to be received;

d) correlating reception of said navigation signal; and e) measuring a pseudodistance and radial pseudospeed of said object-user relative to said satellite for calculating the positioning coordinates and speed of motion of said object-user and the correction factor for a time scale of said object user.

2. The method according to claim 1 wherein said M-sequence is 511 elements in length.

3. The method according to claim 1 wherein the synchronization code has a repetition period of 2 seconds and a number of symbols equal to 30.

4. The method according to claim 2 wherein the synchronization code has a repetition period of 2 seconds and a number of symbols equal to 30.

5. Apparatus for radio navigation positioning with the aid of satellites on several orbital planes (A,B,C), each satellite (1) having an individual number and comprising:

a) means for generating a carrier frequency from a sinusoidal signal generated by a frequency and time standard, said carrier frequency being unique for each said satellite or for each pair of mutually opposite satellites in an orbital plane;

b) means for modulating said carrier by a set of signals including an M-sequence pseudorandom sequence common to all of the radio navigation signals generated by each of said satellites and dibit coded signals representing navigation data and a synchronization code;

c) means for receiving said signal by a receiver at an object-user, each said receiver generating a reference signal the heterodyne frequency thereof being selected according to the carrier frequency of the transmitting satellite desired to be received;

d) means for correlating reception of said navigation signal; and e) means for measuring a pseudodistance and radial pseudospeed of said object-user relative to said satellite for calculating the positioning coordinates and speed of motion of said object-user and the correction factor for a time scale of said object user.

6. The apparatus according to claim 5 wherein said M-sequence is 511 elements in length.

7. The apparatus according to claim 5 wherein the synchronization code has a repetition period of 2 seconds and a number of symbols equal to 30.

8. The apparatus according to claim 6 wherein the synchronization code has a repetition period of 2 seconds and a number of symbols equal to 30.

* * * * *